United States Patent [19]

Sigmund

[11] 4,219,225
[45] Aug. 26, 1980

[54] SEALING RINGS FOR THE ENDS OF HEAT-INSULATED PIPE UNITS

[76] Inventor: Fantisek Sigmund, 19 rue du Calvaire, 92210 Saint-Cloud, France

[21] Appl. No.: 917,134

[22] Filed: Jun. 19, 1978

[30] Foreign Application Priority Data

Jun. 23, 1977 [GB] United Kingdom ............... 26452/77
Nov. 18, 1977 [GB] United Kingdom ............... 48158/77

[51] Int. Cl.² ............................................. F16L 51/16
[52] U.S. Cl. ..................................... 285/47; 277/205; 285/111; 285/331
[58] Field of Search ..................... 285/47, 50, 53, 111, 285/110, 379, 294, 331, DIG. 11; 277/52, 53, 181, 182, 189, 205

[56] References Cited

U.S. PATENT DOCUMENTS

| | | | |
|---|---|---|---|
| 2,893,770 | 7/1959 | Poncet | 277/182 |
| 3,369,826 | 2/1968 | Boosey et al. | 285/47 |
| 3,744,823 | 2/1972 | Muir et al. | 285/47 |
| 3,854,756 | 12/1974 | Couch | 285/47 |
| 4,006,920 | 2/1977 | Sadler | 285/138 X |
| 4,084,842 | 4/1978 | Stonitsch | 285/47 |
| 4,162,093 | 7/1979 | Sigmund | 285/47 |

FOREIGN PATENT DOCUMENTS

275108 6/1930 Italy ......................................... 285/111
1080816 8/1967 United Kingdom ..................... 285/110
1363683 8/1974 United Kingdom ..................... 285/47

*Primary Examiner*—Dave W. Arola
*Attorney, Agent, or Firm*—Blanchard, Flynn, Thiel, Boutell & Tanis

[57] ABSTRACT

An elastomeric sealing ring is provided for sealing an end of a pipe unit of the kind comprising a pipe, heat-insulating foam material surrounding the pipe and an outer tubular jacket and in which the pipe projects beyond the ends of the foam material and the jacket projects likewise, but for a shorter distance. The sealing ring is of U-section with a radially disposed base and inner and outer coaxially projecting flanges and has an annular groove formed in the base and extending into the outer flange. In use, the inner flange tightly surrounds a respective pipe end part of the pipe unit, the base is either seated against or spaced from the corresponding end of the foam material and the corresponding jacket end part extends into the annular groove. When two or more pipe units fitted with such sealing rings are joined end-to-end, the interconnected pipe end parts or each joint may be surrounded by heat-insulating foam material extending into contact with or spaced from the bases of the respective sealing rings and this foam material may be surrounded by a tubular outer cover.

17 Claims, 6 Drawing Figures

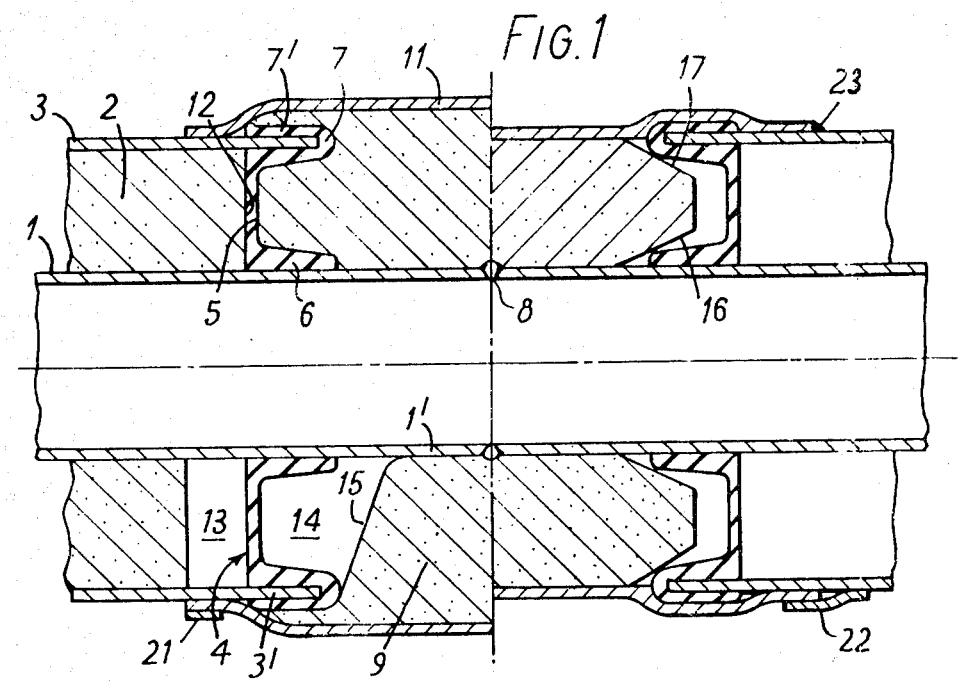
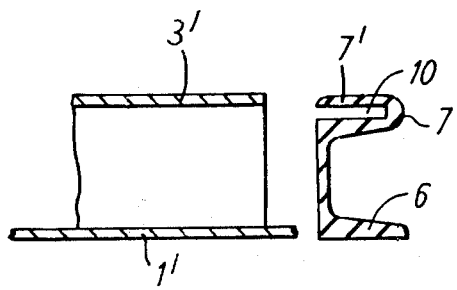
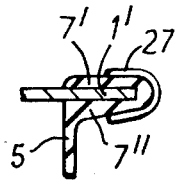 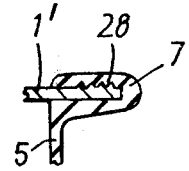 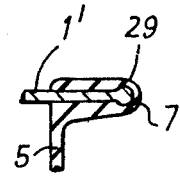 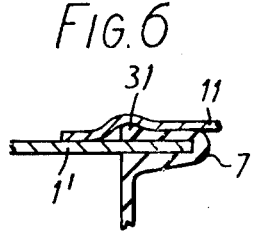

SEALING RINGS FOR THE ENDS OF HEAT-INSULATED PIPE UNITS

BACKGROUND OF THE INVENTION

This invention relates to sealing rings for sealing the ends of heat-insulated pipe units of the kind which consist of a pipe surrounded over the greater part of its length by at least one layer of heat-insulating foam material which is in turn enclosed by an outer jacket of fluid-impervious protective material, the end parts of the pipe projecting beyond the corresponding ends of the layer or layers of heat-insulating material and the ends of the jacket projecting likewise but for a shorter distance, so that annular recesses are formed in the ends of the pipe unit. Such pipe units will hereinafter be designated "pipe units of the kind referred to".

The invention also includes a heat-insulated pipe unit of the kind referred to having at least one end thereof sealed by a sealing ring according to the invention, as well as an improved heat-insulated joint between two pipe units of the kind referred to having their proximate ends sealed by sealing rings according to the invention.

The pipes of pipe units of the kind referred to may be metallic. The or each layer of heat-insulating material may be composed of a microcellular foam material, such as polyol isocyanate, polyurethane, phenolic foam or styrene foam, applied either by injection or by spraying. The outer jacket may be composed of a thermoplastic elastomer, such as polyethylene, P.V.C., a rubber-like compound, a butyl or styrene compound, or may be composed of a bitumatic compound and may be reinforced with Fibreglass (Trade Mark) or nylon.

A primary object of this invention is to provide improved means for sealing the ends of pipe units of the kind referred to, so as to prevent penetration of moisture from the outside into the heat-insulating layer or layers of the pipe units, thus destroying or reducing the effectiveness of the insulating material and, when the pipe units are connected together by heat-insulated joints, to isolate those pipe units from each other so that, in the event of a failure in one pipe unit, leakage into the or each adjoining pipe unit can be prevented.

SUMMARY OF THE INVENTION

The improved sealing ring according to the invention is of substantially U-shaped cross-section and comprises a base part, corresponding to the base of the U-section, which is disposed substantially radially, and inner and outer tubular flanges, corresponding to the two side limbs of the U-section, which project coaxially from radially inner and outer margins of one main surface of the base part, wherein the thickness of the base part is less than the mean thickness of the inner tubular flange, the inner tubular flange has a cylindrical inner surface and a parallel-sided annular groove extends axially from the other main surface of the base part into the interior of the outer flange.

As previously mentioned, the invention also includes a heat-insulated pipe unit of the kind referred to having at least one end thereof sealed by a sealing ring according to the invention. In this heat-insulated pipe unit, the inner surface of the inner tubular flange of the sealing ring is tightly engaged around the outer surface of the respective projecting pipe end part, the respective projecting jacket end part extends into the annular groove in the sealing ring to substantially the full depth of said annular groove and the inner surface of the portion of the outer tubular flange outside the annular groove is tightly engaged with the outer surface of the respective projecting jacket end part.

A sealed heat-insulated joint according to the invention comprises two heat-insulated pipe units according to the invention fitted in the manner already described with sealing rings according to the invention and connected end-to-end by a welded joint or other connection between the projecting pipe end parts of the sealed ends of the two pipe units, wherein the interconnected pipe end parts of the pipe units are surrounded, at least in the regions thereof adjacent the joint or other connection, by heat-insulating foam material and an outer cover of fluid-impervious material is provided over the outer surface of the heat-insulating material, at least parts of the outer surfaces of the outer flanges of the sealing rings and outer surfaces of parts of the pipe unit jackets adjoining the sealing rings.

The invention will now be described by way of example with reference to the accompanying drawings.

BRIEF DESCRIPTION OF THE DRAWINGS

FIG. 1 is a composite diagrammatic longitudinal section illustrating details of three different forms of a joint between two heat-insulated pipe units, FIG. 2 is a fragmentary sectional view illustrating dimensional relationships between a sealing ring and the corresponding projecting pipe and jacket end parts of a pipe unit prior to the fitting of the sealing ring, FIGS. 3 to 5 are fragmentary sectional views illustrating respectively three different means for achieving improved securing and sealing of the outer flange of a sealing ring with respect to the corresponding projecting jacket end part of a pipe unit, and FIG. 6 is a fragmentary sectional view illustrating means for achieving improved securing and sealing of an outer sleeve with respect to the outer flange of a sealing ring.

DESCRIPTION OF THE PREFERRED EMBODIMENTS

In all four forms of the joint shown in FIG. 1, each of two interconnected pipe units comprises a pipe 1 surrounded over the greater part of its length by a layer 2 of heat-insulating foam material which, in turn, is surrounded by an outer protective jacket 3 of fluid-impervious, thermoplastic material. The end parts 1' of each pipe 1 project beyond the corresponding ends of the foam layer 2 and the end parts 3' of the jackets 3 project likewise, but for a shorter distance. Thus, annular recesses are provided in the ends of each pipe unit between the projecting end parts 1' and 3' of the pipe 1 and jacket 3.

The pipe units described above are produced in a factory, in which sealing rings 4 are also produced and fitted to the ends of the said pipe units. Each sealing ring 4 is of generally U-shaped cross-section, the part 5 thereon, which corresponds to the base of the U, being disposed radially and having tubular flanges 6 and 7, which correspond to the side walls of the U, projecting axially from the radially inner and outer margins respectively of the part 5. The inner tubular flange 6 of each sealing ring 4 is a tight fit around the respective projecting pipe end part 1'. A parallel-sided annular groove 10 (FIG. 3), which extends axially into the outer tubular flange 7 from the base of each sealing ring, serves for the reception of the corresponding projecting jacket end part 3', the outer part 7' of the flange 7 then being a tight fit around the respective projecting jacket end part 3'.

After the pipe units fitted with the sealing rings have been transported to the installation site and laid end to end, the pipe end parts 1' thereof are joined together either by butt-welding as at 8 or by some other form of connection, e.g., by a bellows connection (not shown). The interconnected pipe ends part 1' are then surrounded by heat-insulating foam material, e.g., by two preformed half-tubular elements of such material which are assembled and secured around these pipe end parts. Next, an outer sleeve 11 is fitted or formed so that it tightly surrounds the outer surfaces of the foam material 9, the sealing rings 4 and adjoining parts of the two pipe unit jackets 3. The outer sleeve may, for example, be composed of a thermo-shrinkable material and be shrunk onto the said outer surfaces by the action of heat. The sealing of the end parts of the pipe unit jackets 3 may be enhanced by fitting clamping rings 21 over these end parts, or by winding tapes 22 around these end parts and around the adjoining outer surface parts of the pipe unit jackets 3, or by welds 23.

In a first form of joint shown in the top left-hand part of FIG. 1, the base part 5 of each sealing ring 4 has a flat base surface which is seated against a flat end of the foam layer 2 of the respective pipe unit and the foam material 9 not only extends into and fills the annular recess between the flanges 6 and 7 of each sealing ring, but also extends over the outer surface of the outer flange 7 of each sealing ring.

In a second form of joint shown in the bottom left-hand part of FIG. 1, there is an annular space 13 between the base 5 of each sealing ring 4 each sealing ring 4 and the corresponding end face 12 of the foam layer 2 of the respective pipe unit and there is a further annular space 14 between the base 5 of each sealing ring and the proximate end face 15 of the foam material 9. These spaces 13 and 14 allow for movements of the base 5 of the respective sealing ring caused, for example, by differential thermal expansion or contraction of the pipes 1 and jackets of the interconnected pipe units.

In a third form of joint shown on the right-hand side of FIG. 1, each sealing ring 4 is prevented from moving in the direction away from the corresponding end face of the foam layer 2 of the respective pipe unit by its inner and outer flanges 6 and 7 being engaged by inner and outer frusto-conical surface parts 16 and 17 of the foam material 9. In this case, the foam material 9 extends only partly into the annular recess between the inner and outer flanges 6 and 7 of the sealing rings.

In order to ensure that, when each sealing ring 4 is fitted to the respective end of a pipe unit, the inner tubular flange 6 thereof tightly engages the outer surface of the respective projecting pipe end part 1' and the outer part 7' of the tubular flange 7 thereof tightly-engages the outer surface of the respective jacket end part 3', the dimensions of each sealing ring prior to being fitted may be such that, as shown in FIG. 2, the diameter of the inner surface of its inner flange 6 is less than the diameter of the outer surface of the respective pipe end part 1' and the diameter of the inner surface of the outer part 7' of its outer flange 7 is less than that of the outer surface of the respective jacket end part 3'.

In order to improve the sealing of the outer flange 7 of each sealing ring 4 with respect to the corresponding jacket end part 3', a ring 27 of metal or other rigid material may be arranged as shown in FIG. 3, so that it compresses the outer and inner parts 7' and 7" of the outer flange of the sealing ring against the outer and inner surfaces respectively of the said jacket end part 3'. Alternatively, or additionally, the outer surface of the jacket end part 3' may be provided, as shown in FIG. 4, with serrations 28 which engage the inner surface of the outer part 7' of the outer flange 7 of the sealing ring or the jacket end part may be provided with a thickened end portion 29, as shown in FIG. 5, which engages in a corresponding enlargement of the base part of the groove 10 in the sealing ring.

Finally, the sealing and gripping action of the end parts of the outer sleeve 11 (FIG. 1) with respect to the outer part 7' of the outer flanges 7 of the corresponding sealing rings may be enhanced, as shown in FIG. 6, by thickening the free end of each of said outer parts 7', so as to provide an externally projecting rim part 31 thereon, which rim part 31 engages in an annular recess formed in the corresponding end part of the outer sleeve 11 as a result of the latter being shrunk on or otherwise tightly engaged over it.

I claim:

1. An elastomeric sealing ring for sealing the end of a heat-insulated pipe unit of the kind having a pipe surrounded by a layer of heat-insulating material in turn enclosed in an outer jacket of fluid impervious material, the ring being of generally U-shaped cross-section, comprising a relatively thin radially disposed base part, an inner tubular flange projecting axially in one direction from the inner margin of one main surface of the base part and having a cylindrical inner surface for engaging the outer surface of the respective projecting pipe end part of the pipe unit, an outer tubular flange projecting in said one direction from the outer margin of said one main surface of the base part coaxially with respect to said inner tubular flange the thickness of said flanges at their junction with the base part being greater than the thickness of said base part, said base part and said outer tubular flange being formed with a parallel-sided annular groove for receiving the respective jacket end part of the pipe unit, said annular groove extending axially from the opposite main surface of said base part for a substantial distance into the interior of the outer tubular flange, so that said outer tubular flange has an inner portion extending inside said annular groove in said one direction away from said base part and integrally connected, at that end of the outer tubular flange which is remote from said base part, with an outer portion extending outside said annular groove in the opposite direction back towards said base part.

2. A sealing ring as claimed in claim 1, wherein the end of said outer portion of said outer tubular flange which is nearer to the base part is thickened so as to provide an externally projecting rim part.

3. A sealing ring as claimed in claim 1 in which the cross-sectional thickness of said relatively thin base part of said U-cross-section sealing ring is less than the mean thickness of the inner tubular flange and the radial extent of said base part exceeds by several times the radial extent of said annular groove.

4. A sealing ring as claimed in claim 1 in which said base part is thinner and thereby more flexible than the adjoining parts of the inner and outer tubular flanges.

5. In a heat-insulated pipe unit of the kind which comprises a pipe, at least one layer of heat-insulating foam material surrounding said pipe over the greater part of the length of said pipe and an outer jacket of fluid-impervious protective material, the end parts of the pipe projecting beyond the corresponding ends of the foam material and the ends of the jacket projecting likewise but for a shorter distance, so that annular recesses are provided in the ends of the pipe unit, the improvement composed by said pipe unit having at least one end thereof sealed by an elastomeric sealing ring of generally U-shaped cross-section located at least partly within the annular recess in the respective end of said pipe unit, said sealing ring comprising a relatively thin radially disposed base part, a radially inner tubular flange projecting axially from the inner margin of one main surface of the base part and having a cylindrical inner surface tightly engaged around the outer surface of the respective projecting pipe end part and an outer tubular flange projecting in the same direction as said inner flange from the outer margin of said one main surface of the base part coaxially with respect to said inner tubular flange the thickness of said flanges at their junction with the base part being greater than the thickness of said base part, said base part and said outer tubular flange being formed with a parallel-sided annular groove extending axially from the other main surface of said base part for a substantial distance into the interior of the outer tubular flange so that said outer tubular flange has an inner portion extending inside said annular groove in the direction away from said base part and integrally connected, at that end of the outer tubular flange which is remote from said base part, with an outer portion extending outside said annular groove in the direction towards said base part, said outer portion being tightly engaged around the outer surface of the respective projecting jacket end part of said pipe unit.

6. A pipe unit as claimed in claim 5, wherein the tight engagement of the inner surface of said inner tubular flange of the sealing ring around the outer surface of the respective projecting pipe end part and of the inner surface of the outer portion of the outer tubular flange around the outer surface of the respective projecting jacket end part is due to the dimensions of the sealing ring being such that, in the relaxed state thereof, each of said inner surfaces is of smaller diameter than the respective one of said outer surfaces.

7. A pipe unit as claimed in claim 5, wherein the sealing ring is additionally secured and sealed with respect to the corresponding projecting jacket end part by a clamping ring comprising the outer and inner portions of the outer tubular flange of the sealing ring against the outer and inner surfaces respectively of said projecting jacket end part.

8. A pipe unit as claimed in claim 5, wherein the sealing ring is additionally secured and sealed with respect to the corresponding projecting end part by the outer surface of the projecting jacket end part being formed with serrations engaging in the inner surface of the outer portion of the outer tubular flange of the sealing ring.

9. A pipe unit as claimed in claim 5, wherein the sealing ring is additionally secured and sealed with respect to the corresponding projecting jacket end part by the projecting jacket end part having a thickened end portion engaging in a corresponding enlargement of the base part of the annular groove in the sealing ring.

10. A sealed heat-insulated joint between two heat-insulated pipe units, each of which pipe units comprises a pipe, at least one layer of heat-insulating foam material surrounding said pipe over the greater part of the length of said pipe and an outer jacket of fluid-impervious protective material, the end parts of the pipe projecting beyond the corresponding ends of the foam material and the ends of the jacket projecting likewise but for a shorter distance, so that annular recesses are provided in the ends of the pipe unit, said two pipe units being connected end-to-end by jointing means between juxtaposed projecting pipe end parts thereof, each of said pipe units having the end thereof which is nearer to the jointing means sealed by a respective elastomeric sealing ring of generally U-shaped cross-section located at least partly within the annular recess in the respective end of said pipe unit, said sealing ring comprising a relatively thin radially disposed base part, a radially inner tubular flange projecting axially from the inner margin of one main surface of the base part and having a cylindrical inner surface tightly engaged around the outer surface of the respective projecting pipe end part and an outer tubular flange projecting in the same direction as said inner flange from the outer margin of said one main surface of the base part coaxially with respect to said inner tubular flange the thickness of said flanges at their junction with the base part being greater than the thickness of said base part, said base part and said outer tubular flange being formed with a parallel-sided annular groove extending axially from the other main surface of said base part for a substantial distance into the interior of the outer tubular flange so that said outer tubular flange has an inner portion extending inside said annular groove in the direction away from said base part and integrally connected, at that end of the outer tubular flange which is remote from said base part, with an outer portion extending outside said annular groove in the direction towards said base part, said outer portion being tightly engaged around the outer surface of the respective projecting jacket end part of said pipe unit, the interconnected pipe end parts of the two pipe units being surrounded, at least in the region of said jointing means, by heat-insulating foam material and an outer cover of fluid-impervious material being provided over the outer surface of said heat-insulating foam material, over at least part of the outer surfaces of the outer tubular flanges of the sealing rings and over outer surface parts of the pipe unit jackets adjoining the sealing rings.

11. A heat-insulated joint as claimed in claim 10, wherein end portions of the heat-insulating foam material surrounding the interconnected pipe ends parts of the two pipe units extend longitudinally over the outer surface parts of the outer tubular flanges of the sealing rings.

12. A heat-insulated joint as claimed in claim 10, wherein the end portions of the heat-insulating foam material surrounding the interconnected pipe end parts of the two pipe units projected into annular spaces defined by the inner and outer flanges of the sealing rings and each of said end portions has radially inner and outer surface parts engaging those ends of the inner and outer tubular flanges respectively of the corresponding sealing ring which are remote from the base part thereof, so as to limit axial movement of the sealing rings towards the jointing means.

13. A heat-insulated joint as claimed in claim 12, wherein said radially inner and outer surface parts of the end portions of said heat-insulating foam material are frusto-conical surface parts.

14. A heat-insulated joint as cliamed in claim 10, wherein said other main surface of the base part of each sealing ring is in contact with the proximate end surface of the heat-insulating foam material of the respective pipe unit and said one main surface of the base part of each sealing ring is in contact with the proximate end surface of the heat-insulating foam material surrounding the interconnected pipe end parts of the two pipe units.

15. A heat-insulated joint as claimed in claim 10, wherein said other main surface of the base part of each sealing ring is spaced from the proximate end surface of the heat-insulating foam material of the respective pipe unit and said one main surface of the base part of each sealing ring is spaced from the proximate end surface of the heat-insulating foam material surrounding the interconnected pipe end parts of the two pipe units.

16. A heat-insulated joint as claimed in claim 10, wherein the end parts of the outer cover are tightly secured to the respective pipe unit jackets by clamping rings fitted tightly around said end parts.

17. A heat-insulated joint as claimed in claim 10, wherein the end parts of the outer cover are tightly secured to the respective pipe unit jackets by tapes wound tightly round the said end parts of the outer cover and round axially adjoining outer surface parts of the respective pipe unit jackets.

* * * * *

UNITED STATES PATENT OFFICE
CERTIFICATE OF CORRECTION

Patent No. 4,219,225          Dated August 26, 1980

Inventor(s) Frantisek Sigmund

It is certified that error appears in the above-identified patent and that said Letters Patent are hereby corrected as shown below:

Col. 4, line 36; change "flange the" to ---flange, the---.

Col. 5, line 5; change "composed" to ---comprised---.

Col. 5, line 18; change "flange the" to ---flange, the---.

Col. 6, line 20; change "flange the" to ---flange, the---.

Col. 6, line 46; change "ends" to ---end---.

Col. 6, line 53; change "projected" to ---project---.

Signed and Sealed this

Twenty-fifth Day of November 1980

[SEAL]

Attest:

Attesting Officer

SIDNEY A. DIAMOND

Commissioner of Patents and Trademarks